Jan. 12, 1954     P. J. PAPADAKOS     2,665,859
AIRCRAFT WITH ROTARY AND FIXED WINGS
Filed Dec. 19, 1950     11 Sheets-Sheet 1

Fig.1.

INVENTOR
PETER J. PAPADAKOS
BY
ATTORNEY

Jan. 12, 1954  P. J. PAPADAKOS  2,665,859
AIRCRAFT WITH ROTARY AND FIXED WINGS
Filed Dec. 19, 1950  11 Sheets-Sheet 3

INVENTOR.
PETER J. PAPADAKOS
BY
ATTORNEY

Jan. 12, 1954      P. J. PAPADAKOS      2,665,859
AIRCRAFT WITH ROTARY AND FIXED WINGS
Filed Dec. 19, 1950      11 Sheets-Sheet 5

Inventor
PETER J. PAPADAKOS
By Robert E. Burns
Attorney

Jan. 12, 1954 P. J. PAPADAKOS 2,665,859
AIRCRAFT WITH ROTARY AND FIXED WINGS
Filed Dec. 19, 1950 11 Sheets-Sheet 6

Fig.7.

Inventor
PETER J. PAPADAKOS

Attorney

Patented Jan. 12, 1954

2,665,859

UNITED STATES PATENT OFFICE 2,665,859

AIRCRAFT WITH ROTARY AND FIXED WINGS

Peter James Papadakos, Brooklyn, N. Y., assignor to Gyrodyne Company of America, Inc., New York, N. Y., a corporation of New York Application December 19, 1950, Serial No. 201,628

5 Claims. (Cl. 244—7)

The present invention relates to aircraft and more particularly to aircraft having both fixed and rotary wings.

Helicopters have many desirable characteristics, in particular their ability to hover, to fly in any direction and to rise and descend vertically so that they can land virtually anywhere and can take off without any prepared airstrip. However, they have the disadvantage of low speed and poor performance in forward flight. Fixed wing aircraft are capable of higher speed and have better performance in forward flight but are less maneuverable and require a runway of suitable length for taking off and landing.

It is an object of the present invention to provide a "convertoplane," i. e. an aircraft having the desirable characteristics of a helicopter during take-off and landing and the desirable characteristics of a fixed wind aircraft in forward flight.

The aircraft in accordance with the present invention comprises a fuselage, coaxial contrarotating rotors above the fuselage, fixed wings projecting laterally from the fuselage, twin engines carried in engine cells on the wings and propellers providing thrust for forward flight, the engines being arranged to drive alternatively or simultaneously both the rotors and the propellers. During take off, landing and hovering, one hundred per cent of the engine power can be used for driving the rotors to provide vertical lift. In forward flight, 75% to 90% of the engine power can be used for driving the propellers. The necessary thrust for forward flight is thus provided more efficiently by the propellers instead of by tilting the whole aircraft to provide a horizontal component of rotor lift, as in the conventional helicopter. The pilot is afforded full control of the aircraft at all times by controlling the speed and pitch of the rotors, both cyclically and non-cyclically, by controlling the pitch of the propellers and by the manipulation of movable control surfaces for controlling the aircraft in forward flight. The operating characteristics of the aircraft in accordance with the present invention differ from those of both the helicopter and the fixed wing aircraft, combining the better features of both types while eliminating undesirable characteristics.

During take-offs and landings and at low speed, the aircraft in accordance with the invention performs as a helicopter. For faster forward flight, increased power is applied to the propellers and the fixed wing pick up lift, thereby unloading the rotors. As the speed increases, the control of the aircraft is taken over more and more by the movable control surfaces, as in an airplane. Thus, the aircraft gradually "converts" from a helicopter to an airplane as its forward speed increases. When the transition is complete, the major portion of the lift is carried by the fixed wings and the rotors function only for additional control. The speed limit is reached only when the thrust is equalled by the drag, as is the case with all airplanes, and is not limited by blade stall, as is the case with helicopters.

The objects and advantages of the invention will be further understood from the following description of a preferred embodiment shown by way of example in the accompanying drawings, in which.

The aircraft shown in the drawings comprises a fuselage 1 surmounted by a rotor head 2 having an upper rotor 3 and a lower rotor 4, fixed wings 5 projecting from the sides of the fuselage carrying nacelles 6 having engines which drive both the rotors 3 and 4 and also propellers 7 which provide thrust for forward propulsion and a control and stabilizing empennage comprising horizontal stabilizers 9, vertical stabilizers 10, elevators 11 and rudders 12. The aircraft is also provided with suitable landing gear shown in the form of main wheels 13 and a caster nose wheel 14.

The fuselage 1 is relatively short and compact. In the embodiment shown in the drawings, Figs. 1 through 11, the length of the fuselage is approximately equal to the span of the fixed wings and to the radius of the rotors. This compactness is permitted by the fact that no tail rotor is required and, moreover, the empennage 8 can be relatively close to the wing since the control provided by the elevators 11 and rudders 12 is supplemented by that provided by the rotor system so that a long lever arm is not needed. Since the rotors are driven by the outboard engines in nacelles 6, the interior of the fuselage is wholly unobstructed except for the rotor shafts and, hence, is available for passengers and cargo. The wings and the lower portion of the fuselage are preferably made watertight so that the aircraft is amphibious. In this connection, it will be noted that, since the propellers 7 are not turning during take off or landing, they will not be damaged when landing on water, even though the engine nacelles are mounted low. The outboard mounting of the engines makes it possible to soundproof the fuselage effectively.

The wings 5 comprise a central wing section 15 that projects to both sides of the fuselage and outer wing sections 16 that extend beyond the engine nacelles 6. The outer wing sections 16 are preferably foldable to the position shown in dotted lines in Fig. 2 and may be provided with ailerons 17. While a low wing construction is shown, the wings may, if desired, be mounted higher on the fuselage and the engine nacelles, instead of being approximately centered, may be mounted above or below the wings, if desired. It will be noted that the wing span is considerably less than the diameter of the rotors, being preferably 50 to 75% of the rotor diameter.

An engine 20 is mounted in each of the nacelles 6, being supported by an engine mount ring 21 and a forward engine mount 22. The engine is cooled by a fan 23. While the engines are shown as being internal combustion reciprocating engines of the radial type, other suitable engines may be used, as, for example, opposed cylinder "pancake" engines or turbines.

Figure 1:
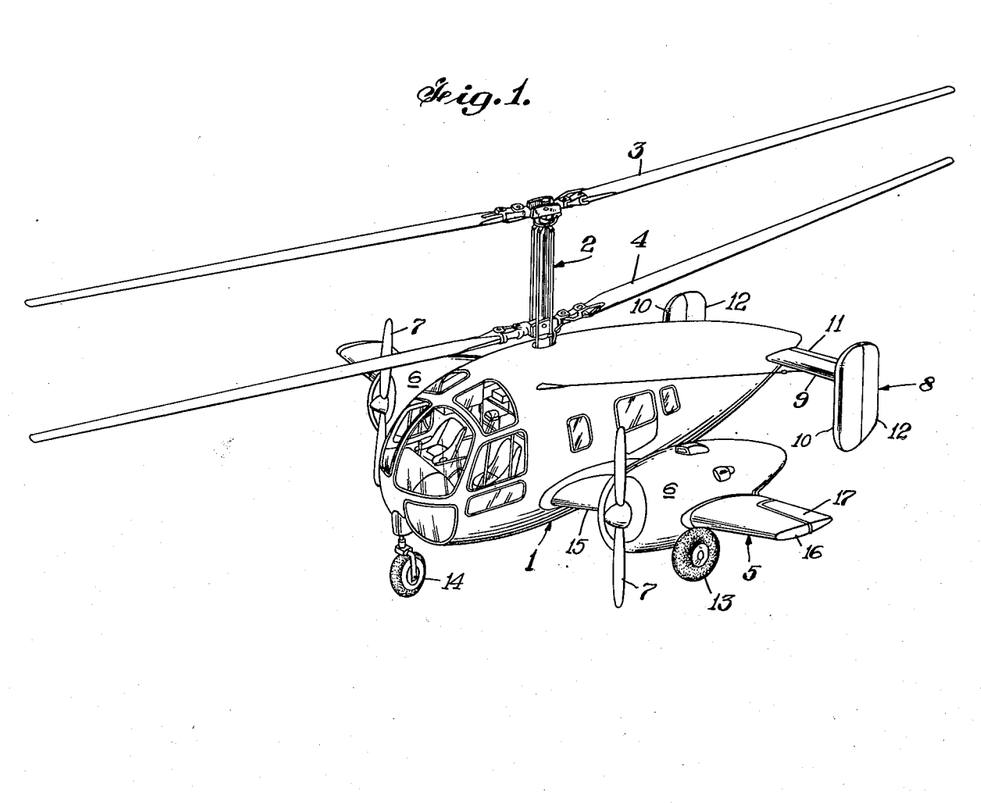
Fig. 1 is a perspective view of an aircraft in accordance with the invention.
Figures 2, 3:
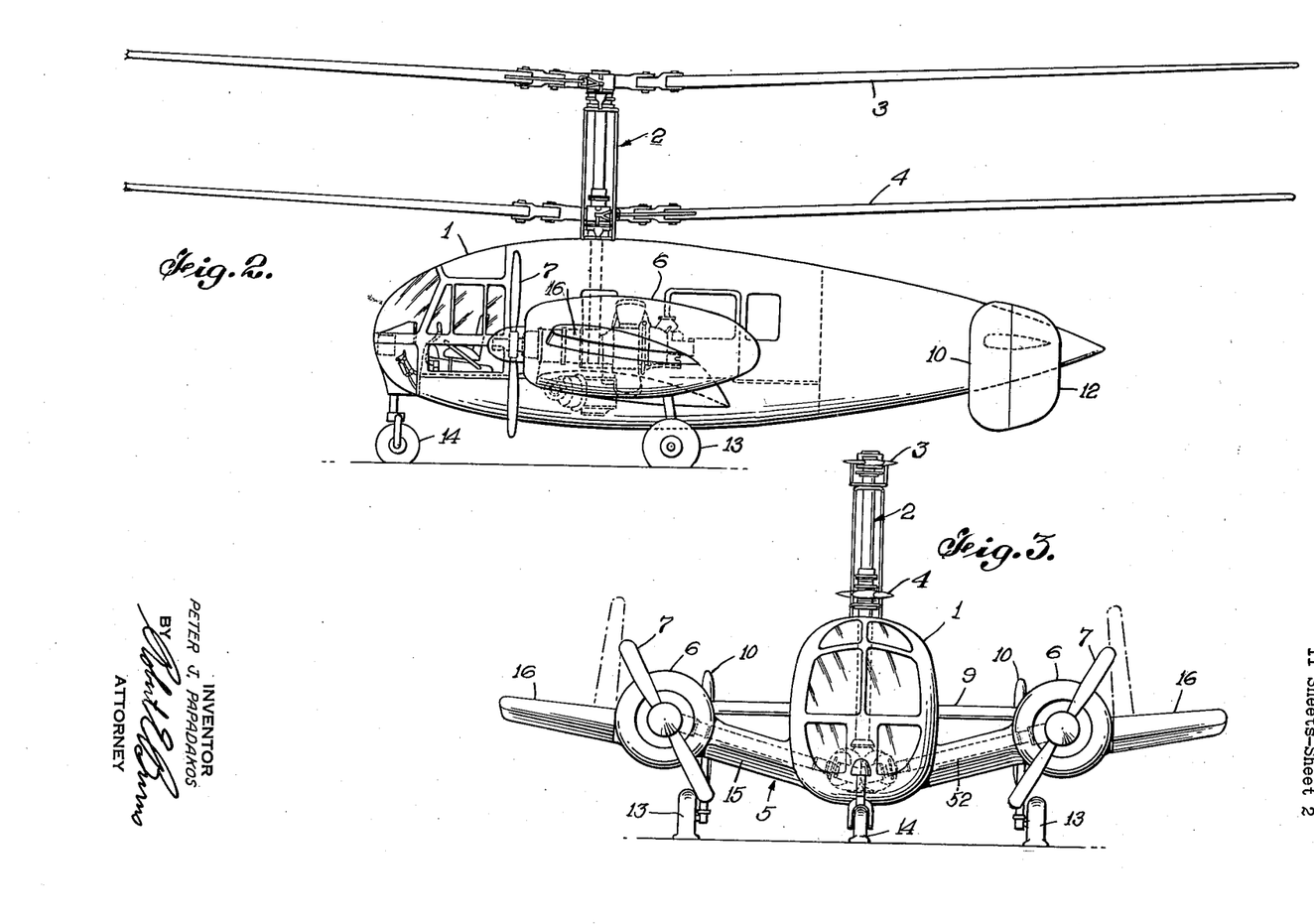
Fig. 2 is a front elevation.
Fig. 3 is a side elevation.
Figure 4:
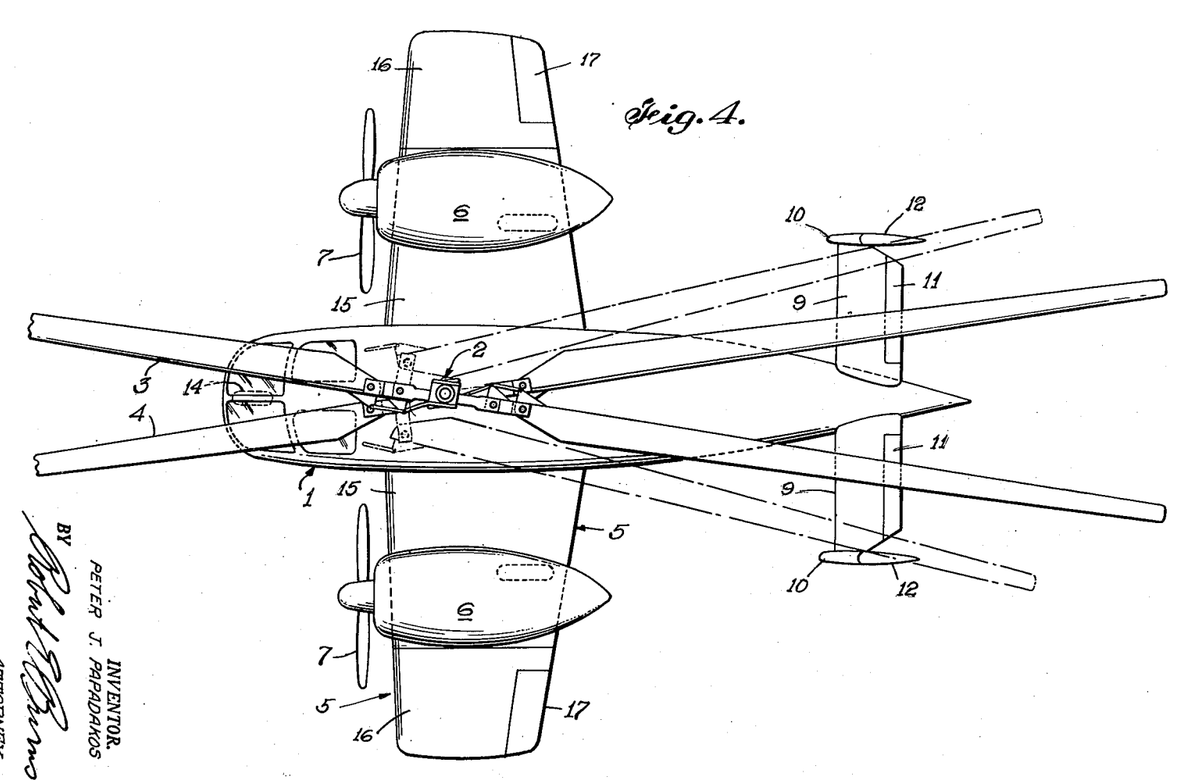
Fig. 4 is a plan.
Figure 5:
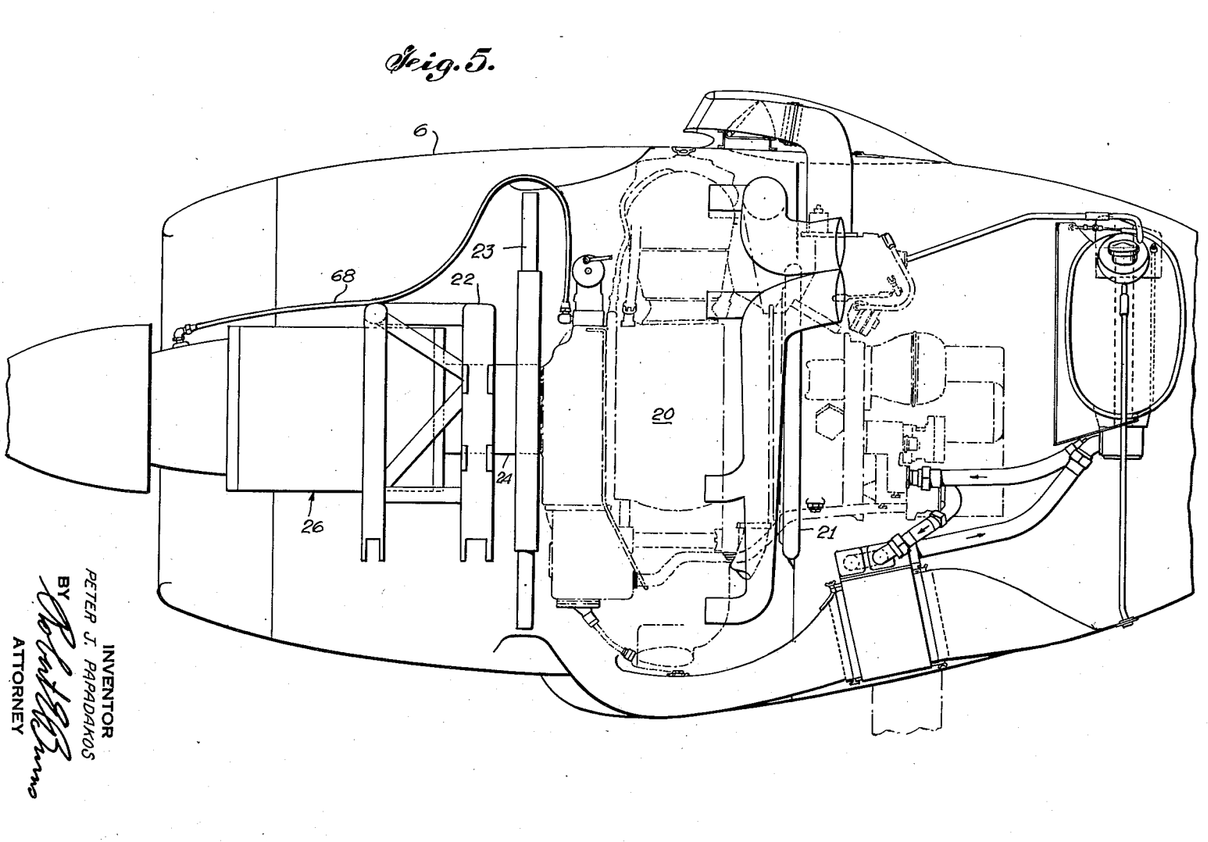
Fig. 5 is a schematic side elevation of one of the engine nacelles.

Each engine is coupled by a flexible coupling 24 to the input shaft 25 of a transmission unit 26 disposed in the forward portion of the nacelle (Fig. 5). The transmission units 26 provide for selectively driving the propellers and the rotors so that engine power may be applied to either or both. Moreover, provision is made for driving the rotors at either of two gear ratios and for changing from one gear ratio to the other during flight.

Figure 6:
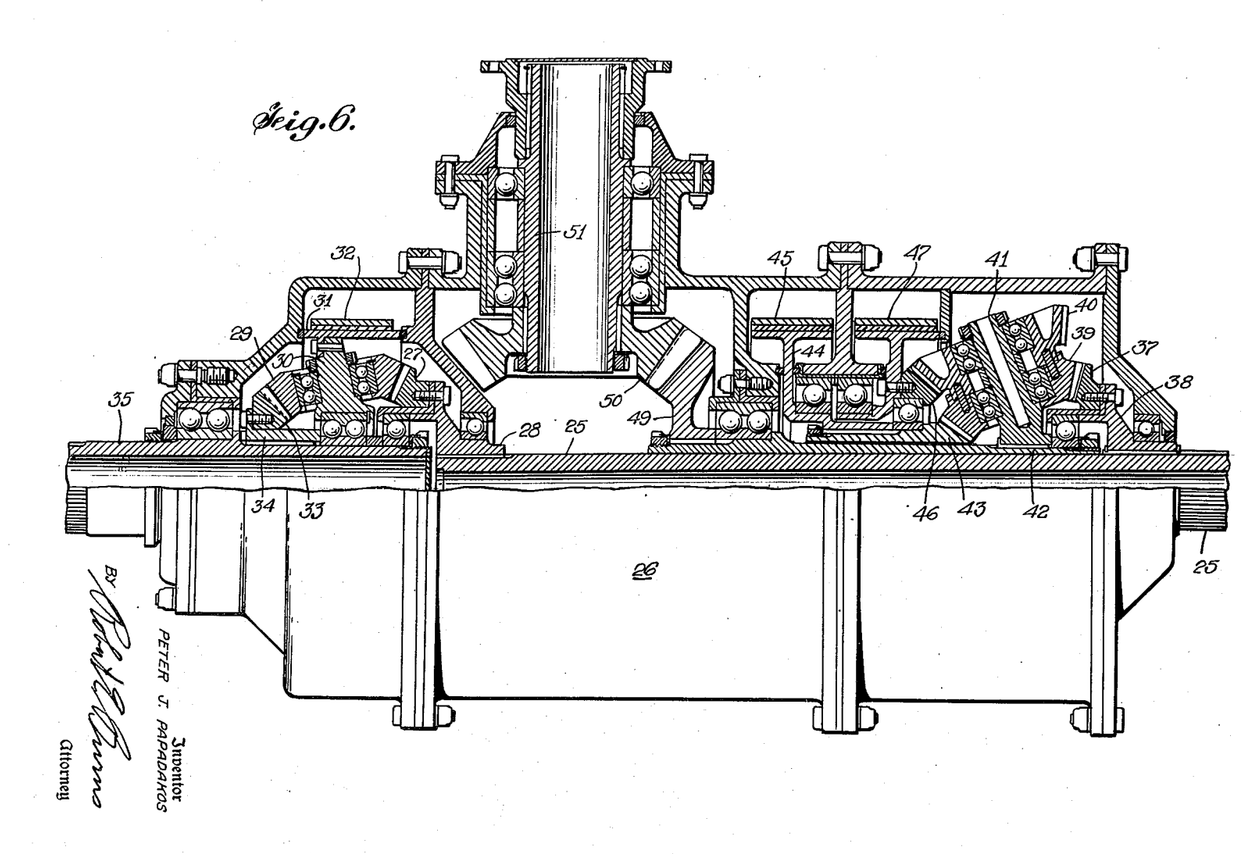
Fig. 6 is an enlarged plan, partly in section, of the transmission unit in the forward part of the engine nacelle shown in Fig. 5.

The construction of the transmission units is shown in Fig. 6. The propeller 7 is driven through a bevel gear 27 carried by a collar 28 which is fixed on the inner end of the power input shaft 25, for example by being keyed or splined thereon. The bevel gear 27 meshes with one or more bevel pinions 29 rotatably supported on a cage 30 which in turn is rotatable about the axis of the input shaft and carries a brake drum 31 adapted to be releasably held by a brake band 32. The pinion or pinions 29 mesh with a bevel gear 33 carried by a collar 34 fixed to the propeller drive shaft 35 which is coaxial with the input shaft 25 and on which the propeller 7 is mounted. When the cage 30 is held by the brake band 32, the propeller drive shaft is driven through the gear 27, 29 and 33 which are designed to give any gear reduction or increase desired. When the brake band is released, no power is transmitted to the propeller.

Power is transmitted to the rotors through a bevel gear 37 carried by a collar 38 fixed on the power input shaft 25 and meshing with the inner of two pinions 39 and 40 which are secured to one another so as to rotate together, being rotatably supported on a cage 41 which in turn is rotatable about the axis of the input shaft 25. Preferably, there are two or more pairs of pinions 39, 40 distributed around the cage 41 which is fixed to a hollow shaft 42 that surrounds, and is coaxial with, the input shaft 25. The inner pinion 39 meshes with a bevel gear 43 that is rotatable on the shaft 42 and is fixed to a brake drum 44 adapted to be releasably held by a brake band 45. The outer pinion 40 meshes with a larger bevel gear 46 that is rotatable coaxially with the input shaft 25 and is fixed to a brake drum adapted to be releasably held by a brake band 47. On the inner end of the shaft 42, there is fixed a bevel gear 49 meshing with a larger bevel gear 50 fixed on a power output shaft 51 which is disposed at right angles to the power input shaft 25 and transmits power to the rotors. The two brake band type clutches 45 and 48 are interconnected so that either may be engaged but not both at once. When neither of the clutches is engaged, no power is transmitted to the rotors. When one or the other of the clutches 45, 48 is engaged, power is transmitted to the rotors at a gear ratio depending on which of the gears 43, 46 is held stationary.

Figure 7:
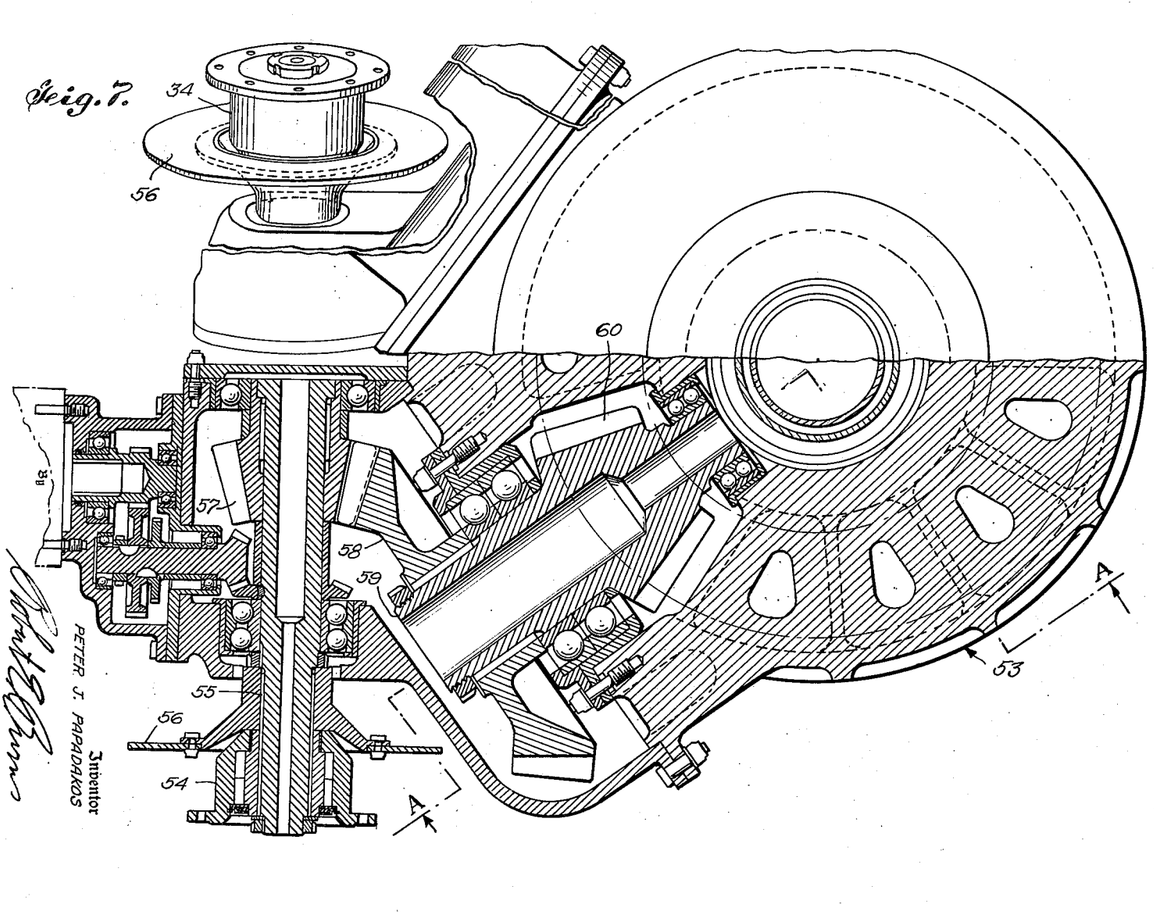
Fig. 7 is a plan, partly in section of a gear box at the base of the rotor shafts, the section being taken on the line B—B in Fig. 8.
Figure 8:
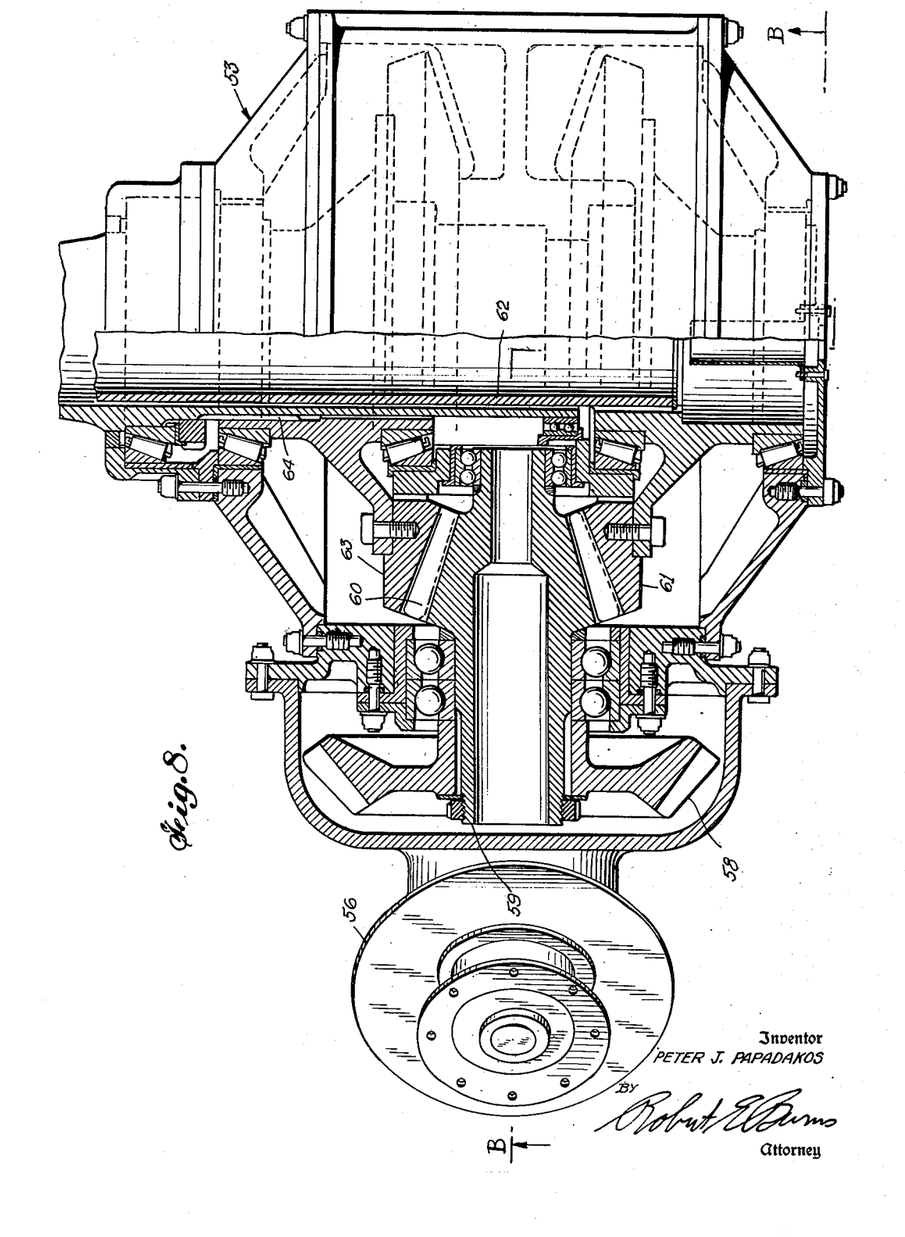
Fig. 8 is a vertical section on the line A—A in Fig. 7.

The output shafts 51 of the two transmission units 26 in the engine nacelles are connected by torque tubes 52 extending through the central wing section 15 (Fig. 2) to a rotor transmission unit 53 rotated directly below the rotors and preferably mounted below the floor of the cabin in the fuselage 1. As the transmission 53 is symmetrical about the longitudinal central plane of the fuselage, one half only of the transmission is shown in detail in the drawings (Figs. 7 and 8). The torque tube 52 is connected through a free wheeling unit 54 to a stub shaft 55 on which there is mounted a rotor brake disc 56. A bevel gear 57 on the shaft 55 meshes with a larger bevel gear 58 on a shaft 59 which is rotatable on an axis that is radial to the vertical axis of the rotors. The inner end of the shaft 59 carries a smaller bevel gear 60 that meshes with a bevel gear ring 61 fixed on the lower end of an inner tubular shaft 62 on which the upper rotor 3 is mounted and also meshes with a bevel gear ring 63 fixed on an outer tubular shaft 64 on which the lower rotor 4 is mounted. It will be seen that the arrangement shown provides a gear reduction and also that the two rotor shafts 62 and 64 are positively driven at equal speeds in opposite directions. The free wheeling units 54 permit autorotation of the rotors in the event of engine failure and also permit both rotors to be driven by one of the engines in the event the other fails.

The propellers 7 are of variable pitch and preferably reversible, each being controlled from a control unit 67 (Fig. 5) mounted in the engine nacelle and connected to the propeller by a line 68. The rotors 3 and 4 are also of variable pitch, provision being made for varying the pitch of the rotors both cyclically and non-cyclically. The cyclical pitch control of the rotors provides fore and aft, and also lateral, control of the aircraft. The non-cyclical pitch control includes collective pitch variation of both rotors in the same sense for ascent or descent and also differential variation of the two rotors in opposite senses for directional control, i. e. steering, by virtue of the torque differential of the rotors while their combined lift remains substantially the same.

Figure 9:
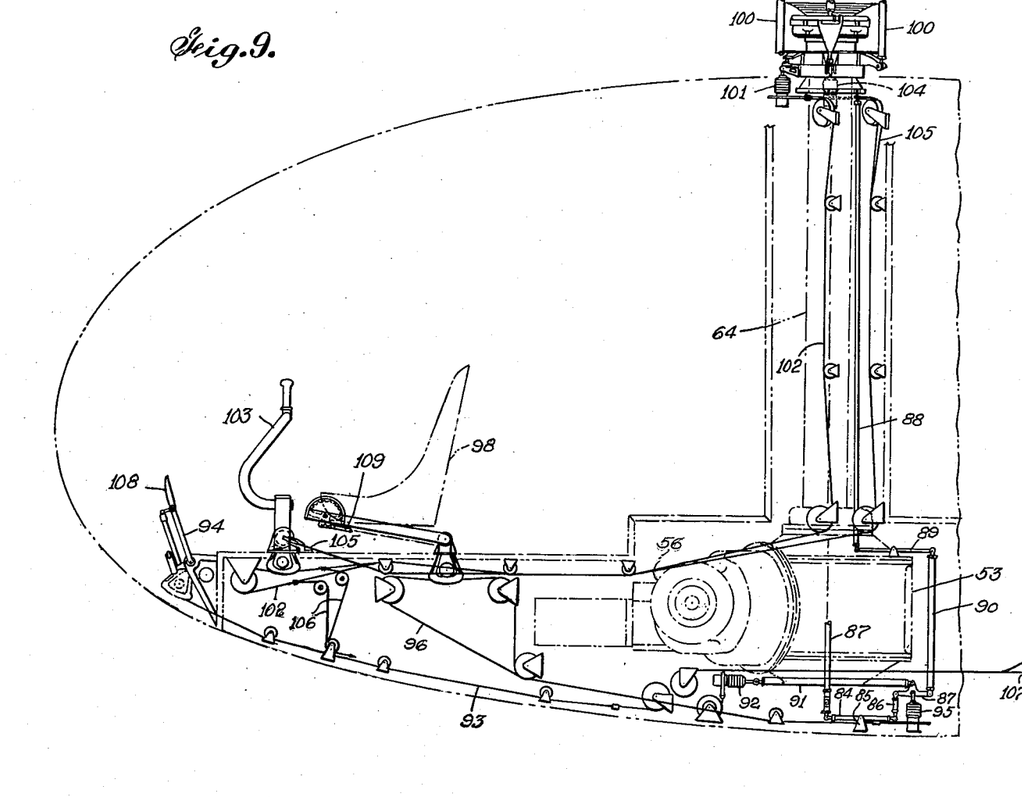
Fig. 9 is a schematic side elevation of the interior of the forward portion of the fuselage, showing pilot controls.
Figure 10:
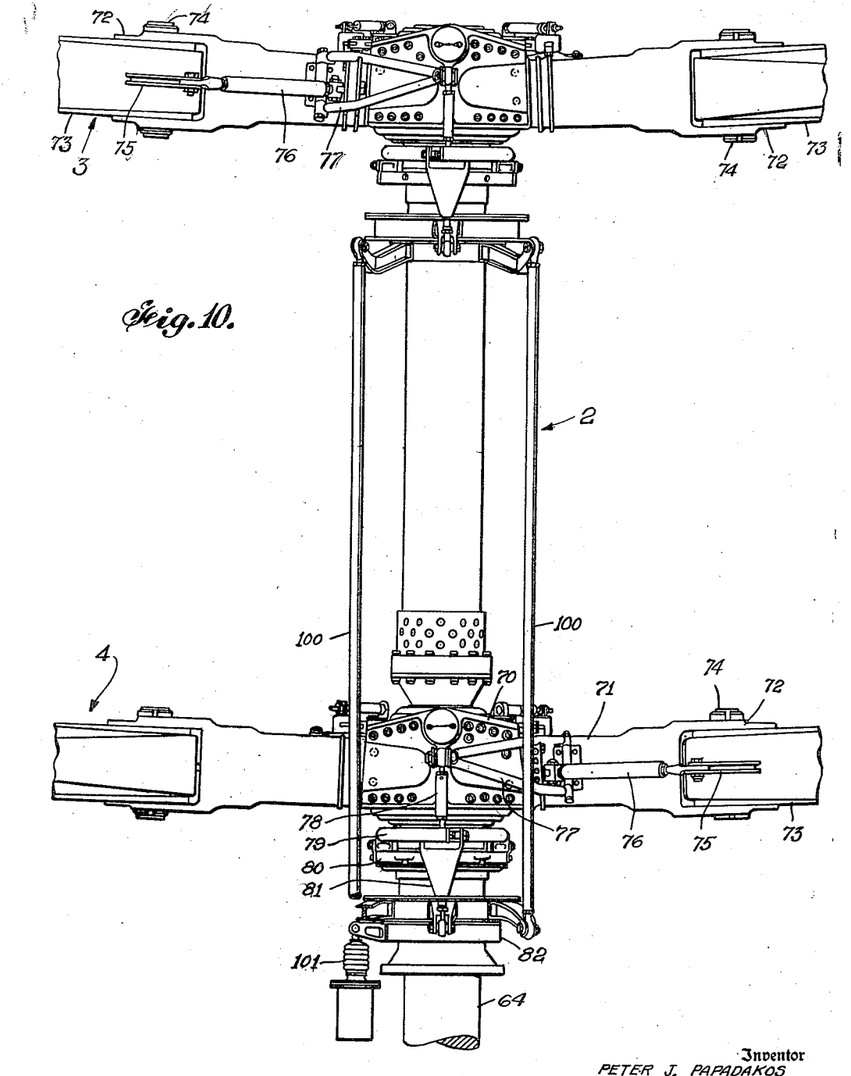
Fig. 10 is an elevation of the rotor head.
Figure 11:
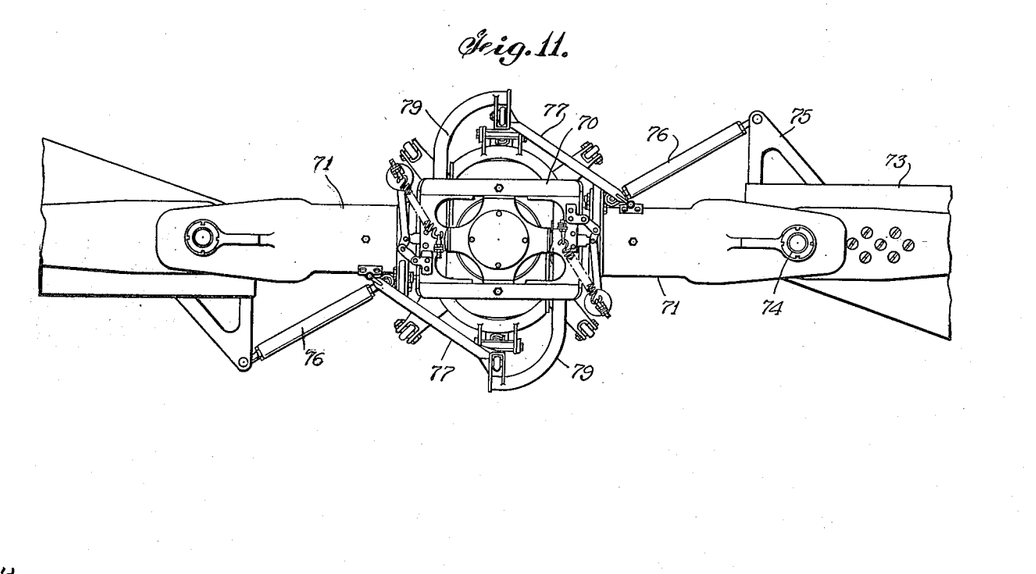
Fig. 11 is a plan of the rotor head.

The various controls are illustrated in Figs. 9, 10 and 11. These figures also show the construction of the rotor head. The rotors are of the semi-rigid type. Each has a hub portion 70 which surrounds the rotor shaft and is pivotally connected to the shaft so as to have limited rocking movement about an axis that is perpendicular to a plane defined by the rotor shaft and the rotor blades. Shank portions 71 are rotatably held in the opposite end portions of the hub, the axes of the shanks being fixed relative to the hub and forming a slight dihedral relative to one another. The outer end portion 72 of each shank is forced to receive the butt end of the rotor blade 73 which is attached by a pin 74. The drag and anti-drag forces on the blade are taken by a bracket 75 and drag link 76. The shank portion 71 of each blade is provided with a pitch control horn for rotating the shank relative to the hub 70 to change the pitch of the blade.

The pitch control horn 77 is connected by a link 78 to one side of a C-shaped cross-bar 79 which extends around the rotor shaft and is pivotally connected to diametrically opposite sides of a collective pitch collar 80 which rotates with the rotor shaft and is slidable axially of the shaft. At a point approximately opposite the link 78, the cross-bar 79 is connected by a link 81 to a universally tiltable swash plate 82. As the rotor turns, the swash plate 82 provides for cyclical pitch variation of the rotor blades, depending on how the swash plate is tilted. The connection of the pitch control horns 77 with the swash plate through the scissors-like cross-bars 79 pivotally carried by the vertically slidable collective pitch collar 80 provides for the introduction of collective pitch control since the pitch of the wing will be determined by the combined effect of the swash plate 82 and the collective pitch collar 80.

Provision is made for moving the collective pitch collars 80 of the two rotors, either in the same direction for cumulative pitch variation, or in opposite directions for differential pitch variation of the two rotors. The collective pitch collar 80 of the upper rotor is movable vertically by being connected to a rod 83 which extends down inside the rotor shafts and is connected at its lower end to a rocking lever 84 (Fig. 9) pivoted at 85. The other end of the lever 84 is connected by a link 86 to a differential collective pitch mixing lever 87 which is mounted for both rocking and translatory vertical movement. The collective pitch collar 80 of the lower rotor is connected by a rod 88, rocking lever 89 and rod 90 to the opposite end of the differential pitch mixing lever 87. An upwardly projecting arm on the lever 87 is connected by a link 91 to a differential collective pitch screw jack 92 operated by cables 93 from rudder pedals 94. Operation of the rudder pedal acts through the screw jack 92 to rock the differential collective pitch mixing lever 87 about its pivot and thereby move one of the collective pitch collars 80 upwardly while moving the other down to change the pitch of the two rotors in opposite senses. The differential collective pitch mixing lever 87 is also movable vertically by means of a collective pitch screw jack 85 which is operated by cables 96 from a collective pitch control stick 97 alongside the pilot's seat 98. Operation of the collective pitch control stick 97 acts through the screw jack 95 to raise or lower the differential collective pitch mixing lever 87 and thereby change the pitch of the two rotors in the same sense.

The swash plates 82 of the two rotors are connected by a plurality of rods 100, so that they always tilt together. The tilting of the swash plates 82 is controlled by means of a fore and aft cyclic screw jack 101 operated by cables 102 from a cyclic pitch control stick 103 in front of the pilot's seat and a lateral cyclic screw jack 104 connected by cables 105 to the control stick 103 so that fore and aft movement of the stick operates the fore and aft cyclic screw jack 101 while lateral movement of the stick operates the lateral cyclic screw jack 104.

The control of the movable control surfaces of the aircraft, namely the elevators 11, rudders 12, and ailerons 17, is coordinated with the control of the coaxial contrarotating rotors described above. Thus, the cables 102, which are actuated by the stick 103 to operate the fore and aft cyclic screw jack 101, are connected by cables 106 to the elevators 11. Likewise, the cables 93 that are actuated by the rudder pedals to operate the differential collective pitch screw jack 92 are connected by cables 107 to the rudders. The stick 103 is also connected to the ailerons 17 so that lateral movement of the stick operates the ailerons. Additional controls provided for the pilot include a toe brake 108, throttle 109 and controls for the three brake band clutches 32, 45 and 47 (Fig. 6) and for the pitch of the propellers 7.

In take off, hovering and landing, the brake band clutch 32 (Fig. 6) is disengaged so that the propellers 7 do not operate while one or the other of the clutches 45, 47—depending on the desired gear ratio—is engaged to supply full engine power to the rotors. Control is provided by varying the pitch of the rotor blades cyclically, collectively and differentially by means of the controls described and shown (Fig. 9). For forward flight, the clutches 32 are engaged to drive the propellers 7 and thereby provide a forward thrust. Hence, not having to tilt forwardly for forward flight like a helicopter, the aircraft in accordance with the invention remains substantially level so that the increased drag characteristic of a helicopter is avoided. The level attitude of the aircraft also avoids the negative lift on the fuselage that occurs in a helicopter by reason of its having to tilt forwardly for forward flight.

As the speed of a helicopter is increased substantially above 100 miles per hour, an increasing portion of the retreating blade is in a region of negative relative wind velocity and, in order to sustain the aircraft, the pitch of the retreating blade must be greatly increased. Finally, this angle of attack of the retreating blade becomes so large that blade stall occurs, preventing any further increase in forward speed. Before full blade stall occurs, there is a periodic tip stall effect which is responsible for much of the vibration troubles encountered during high speed helicopter flight. The flight characteristics of the aircraft in accordance with the present invention are quite different. Forward thrust is provided by the propellers 7 and, as the forward speed is increased, the fixed wings sustain an increasing proportion of the total aircraft weight. As the demands on the rotor are thus progressively decreased, the danger of blade stall is diminished. By proper selection of wing area and incidence angle, it is thus possible to avoid blade stall for all expected flight conditions. Since the collective pitch requirements of the rotors decrease, instead of increase, at higher speeds, the aircraft in accordance with the invention is smoother in operation, more efficient and safer at higher speeds. The proportionment of power supplied to the propellers and the rotors, respectively, is controlled by the respective pitches and by the gear ratio selected for the rotor drive. In fast forward flight, as much as 75 to 90% of the engine power is delivered to the propellers.

The aircraft in accordance with the present invention thus has the following characteristics:

1. The danger of rotor blade stall, with consequent adverse effects upon stability and maximum speed, is eliminated by unloading the rotor through the lift provided by the wings in forward flight and by utilizing the propellers for horizontal thrust.

2. The level flight attitude of the aircraft eliminates negative fuselage lift and affords greater flight comfort.

3. There is no sudden loss of rotor R. P. M. in the event of engine failure during forward flight since the aircraft flies with a low blade pitch.

4. Objectionable lateral azimuth forces, both steady and vibratory, are eliminated by reason of the cancellation of such forces with a coaxial rotor system.

5. With the rigidly interconnected type of rotor, correctly pre-coned and having the cyclic and collective pitch axes coincident, an advantage is gained in that blade structural deflection, vibration due to Coriolis effects, and control feedback forces are reduced.

6. The reduction of blade flapping and the availability of aerodynamic damping from the propellers considerably increases stability in forward flight and results in smoothness of flight.

7. Automatic locks are preferably provided to prevent rotor blade flapping at low rotor speeds and thereby eliminate the danger of damage due to unrestricted flapping during landing, warm-up and idling.

8. With the rigidly interconnected type of rotor, the possibility of "ground resonance" is eliminated.

9. Contrarotating rotors neutralize torque reactions on the fuselage, thus eliminating troublesome and sometimes dangerous inertia and torque effects, or "ground looping," during quick starts or stops of the motor.

10. The greater kinetic energy of the coaxial rotor system permits vertical descent at a much slower rate during power-off landings.

11. The reduced blade pitch requirement characteristic of the aircraft in forward flight effectively reduces periodic tip stall. Consequently, vibration from this source is reduced and the alternating stresses on the blades and hub are less.

Figures 12, 13:
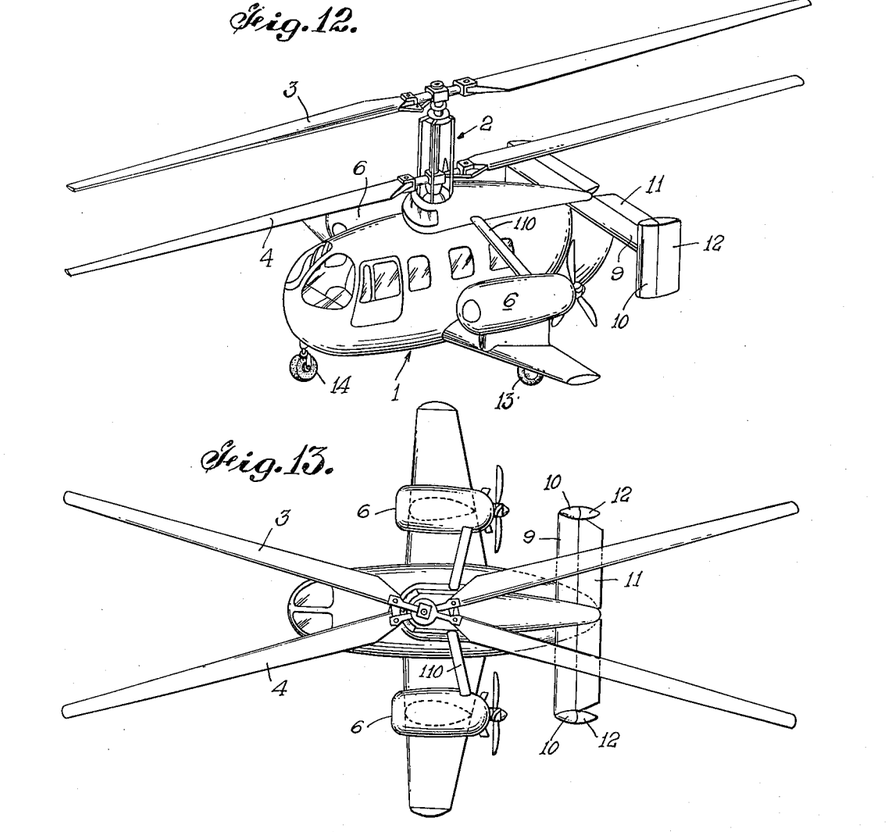
Figs. 12, 13 and 14 are perspective, plan and front elevation of another embodiment.
Figure 14:
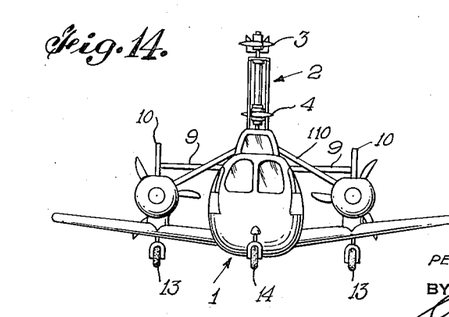

While an embodiment of the present invention has been described in detail, it will be understood that this is only by way of example and that modifications may be made within the scope of the invention. Thus, for example, as illustrated in Fig. 12, pusher-type propellers may be used and the rotor transmission may be located at the top, rather than at the bottom, of the fuselage, power from the outboard engines being transmitted by means of torque tubes extending through struts 110. It will further be seen that, in this embodiment, the engine nacelles are mounted above the fixed wings. While two-bladed rotors have been shown, it will be understood that a different number of blades can be used for the rotors as well as the propellers. Still other modifications will occur to a person skilled in the art within the scope of the appended claims.

What I claim and desire to secure by Letters Patent is:

1. Aircraft comprising a fuselage, fixed wings projecting laterally from the fuselage, engines carried on said wings and spaced from the fuselage, propellers for forward propulsion associated respectively with and adapted to be driven by said engines, a rotor head surmounting the fuselage and comprising axially spaced, contrarotating coaxial rotors, coaxial shafts carrying said rotors and extending downwardly from the rotors, a central transmission connected to said rotor shafts for driving said rotor shafts at equal speed in opposite directions, a transmission unit disposed adjacent and connected to each engine and a torque tube connecting each of said latter transmission units to the central transmission to provide driving connections between each engine and both rotors, said transmissions comprising means for selectively coupling each engine to both of said rotors and to the propeller associated with the engine.

2. Aircraft comprising a fuselage, fixed wings projecting laterally from the fuselage, engine nacelles carried on said wings and spaced from the fuselage, an engine in each of said nacelles, a propeller associated with and adapted to be driven by each engine, a single rotor head surmounting the fuselage and comprising axially spaced, contrarotating coaxial rotors, transmission means interconnecting said rotors and engines for selectively connecting each of said engines with both rotors to drive said rotors from said engines including driving connections maintaining a fixed speed ratio between the two rotors and means connecting said engines to said propellers for selectively coupling and uncoupling each propeller with its associated engine.

3. Aircraft comprising a fuselage, fixed wings projecting laterally from the fuselage, engine nacelles carried on said wings and spaced from the fuselage, an engine in each of said nacelles, a propeller associated with and adapted to be driven by each engine, a rotor head surmounting the fuselage and comprising variable pitch, axially spaced, contrarotating coaxial rotors, transmission means interconnecting said rotors and engines for selectively connecting each of said engines with both rotors to drive said rotors from said engines including driving connections maintaining a fixed speed ratio between the two rotors, means interconnecting said engines and propellers for selectively coupling and uncoupling each propeller with its associated engine and means for varying the pitch of said rotors to vary the distribution of power to the propellers and rotors between a limit in which substantially all the power of both engines is delivered to the rotors and a limit in which as much as seventy-five to ninety per cent of the power of both engines is delivered to the propellers, the remainder being delivered to the rotors.

4. Aircraft comprising a fuselage, fixed wings projecting laterally from the fuselage, engine nacelles carried on said wings and spaced from the fuselage, an engine in each of said nacelles, a propeller associated with and adapted to be driven by each engine, a rotor head surmounting the fuselage and comprising axially spaced, contrarotating coaxial rotors, transmission means interconnecting said rotors and engines for selectively connecting each of said engines with both rotors to drive said rotors from said engines including driving connections maintaining a fixed speed ratio between the two rotors, and means interconnecting said engine and propellers for selectively coupling and uncoupling each propeller with its associated engine, said interconnecting means including means for varying the speed ratio between the propellers and the rotors.

5. In rotary wing aircraft, a fuselage, fixed wings projecting laterally from the fuselage, engine nacelles carried on said wings and spaced from the fuselage, an engine in each of said nacelles, a propeller associated with each engine, a rotor head surmounting the fuselage and comprising axially spaced, contrarotating coaxial rotors, a central transmission connected to said rotor shafts for driving said rotor shafts in opposite directions at a fixed speed ratio relative to one another, a transmission unit disposed adjacent each engine, a torque tube connecting each of said latter transmission units with said central transmission to provide driving connections between each engine and both rotors, said transmission units comprising means for selectively coupling each engine to both of said rotors and for selectively coupling each engine to the propeller associated with the engine, and pilot control means connected to said units for coupling and uncoupling said rotors and propellers in flight.

PETER JAMES PAPADAKOS.

References Cited in the file of this patent

UNITED STATES PATENTS

| Number    | Name    | Date          |
|-----------|---------|---------------|
| 1,350,456 | Hewitt  | Aug. 24, 1920 |
| 1,783,458 | Windsor | Dec. 2, 1930  |
| 1,877,902 | Kuethe  | Sept. 20, 1932|
| 1,957,277 | Leray   | May 1, 1934   |
| 2,068,617 | Wilford | Jan. 19, 1937 |
| 2,317,340 | Bennett | Apr. 27, 1943 |
| 2,410,533 | Thomson | Nov. 5, 1946  |

FOREIGN PATENTS

| Number  | Country | Date         |
|---------|---------|--------------|
| 616,764 | France  | Nov. 2, 1926 |